United States Patent
Amjad

(10) Patent No.: US 10,186,917 B2
(45) Date of Patent: Jan. 22, 2019

(54) ROTOR ASSEMBLY FOR A POWER GENERATION SYSTEM

(71) Applicant: Unison Industries, LLC, Jacksonville, FL (US)

(72) Inventor: Arslan Amjad, Vestal, NY (US)

(73) Assignee: Unison Industries, LLC, Jacksonville, FL (US)

( * ) Notice: Subject to any disclaimer, the term of this patent is extended or adjusted under 35 U.S.C. 154(b) by 318 days.

(21) Appl. No.: 15/163,015

(22) Filed: May 24, 2016

(65) Prior Publication Data
US 2017/0346354 A1 Nov. 30, 2017

(51) Int. Cl.
| H02K 21/12 | (2006.01) |
| H02K 1/27 | (2006.01) |
| H02K 1/30 | (2006.01) |
| H02K 1/14 | (2006.01) |
| H02K 3/12 | (2006.01) |
| H02K 5/22 | (2006.01) |

(52) U.S. Cl.
CPC ............... *H02K 1/274* (2013.01); *H02K 1/14* (2013.01); *H02K 1/30* (2013.01); *H02K 3/12* (2013.01); *H02K 5/225* (2013.01)

(58) Field of Classification Search
CPC .... H02K 1/2786; H02K 1/278; H02K 1/2773; H02K 1/274; H02K 1/2793
USPC ....... 310/156.21, 156.36, 156.37, 21, 36–37, 310/265–266
See application file for complete search history.

(56) References Cited

U.S. PATENT DOCUMENTS

| 5,319,844 | A | 6/1994 | Huang et al. |
| 5,319,884 | A | 6/1994 | Huang et al. |
| 5,504,382 | A | 4/1996 | Douglass et al. |
| 6,060,809 | A | 5/2000 | Pengov |
| 6,211,593 | B1 | 4/2001 | Nashiki |
| 6,720,698 | B2 | 4/2004 | Galbraith |
| 2002/0047431 | A1* | 4/2002 | Fukushima .......... H02K 1/2733 310/156.47 |
| 2003/0090167 | A1* | 5/2003 | Kajiura .................... B60K 6/26 310/156.36 |
| 2007/0188036 | A1* | 8/2007 | Shibukawa ............ H02K 1/278 310/113 |
| 2011/0018484 | A1* | 1/2011 | Fullerton ................. G09F 7/04 318/696 |

(Continued)

FOREIGN PATENT DOCUMENTS

| CN | 101123386 A | 2/2008 |
| CN | 104852493 A | 8/2015 |

OTHER PUBLICATIONS

Extended European Search Report and Opinion issued in connection with corresponding EP Application No. 17172382.8 dated Oct. 4, 2017.

*Primary Examiner* — Thanh Lam

(74) *Attorney, Agent, or Firm* — Unison Industries, LLC; William Andes

(57) ABSTRACT

A rotor assembly for an electric machine or power generation system, includes a shaft having a rotational axis, a first cylindrical section rotatably supported by the shaft and having a first rotor core, and a second cylindrical section, axially spaced from the first cylindrical section along the rotational axis, the second cylindrical section rotatably supported by the shaft, and wherein a set of magnet surface polarities are arranged to improve power output.

20 Claims, 5 Drawing Sheets

(56) References Cited

U.S. PATENT DOCUMENTS

2011/0037336 A1* 2/2011 Smith .................. H02K 21/20
310/178
2013/0313948 A1 11/2013 Zucker

* cited by examiner

ROTOR ASSEMBLY FOR A POWER GENERATION SYSTEM

BACKGROUND OF THE INVENTION

Electric machines, such as generators, provide for the generation of electricity from a mechanical force. The generation of the electricity occurs due to the interaction of a rotating magnetic field in relation to a set of conductive windings. In one generator example, a rotor rotated by a mechanical force can generate the rotating magnetic field relative to a stationary stator having a set of conductive windings. The interaction generates a current in the stator windings, which can be provided to the power output of the generator, where it can be further transmitted to power an electrical load.

BRIEF DESCRIPTION OF THE INVENTION

In one aspect, the disclosure relates to a rotor assembly for an electric machine including a shaft having a rotational axis, a first cylindrical section rotatably supported by the shaft and having a first rotor core and a first set of radially magnetized magnets including a first subset of magnets having a first outer circumferential surface polarity, and a second subset of magnets having a second outer circumferential surface polarity, and a second cylindrical section, axially spaced from the first cylindrical section along the rotational axis, the second cylindrical section rotatably supported by the shaft and having a second rotor core and a second set of radially magnetized magnets.

In another aspect, the disclosure relates to a power generation system including an electric machine having a stator core, and a rotor configured to rotate relative to the stator about a rotational axis. The rotor further includes a first cylindrical section having a first circumferential outer surface including an alternating first set of radially magnetized magnets and a first set of inductor poles, and a second cylindrical section, axially spaced from the first cylindrical section along the rotational axis, the second cylindrical section having a second circumferential outer surface including an alternating second set of radially magnetized magnets and a second set of inductor poles. Less than half of the surface area of the first circumferential outer surface is occupied by the first set of inductor poles.

In yet another aspect, the disclosure relates to a rotor assembly for an electric machine including a shaft having a rotational axis, a first cylindrical section rotatably supported by the shaft including a first circumferential segment including, sequentially, a first radially magnetized magnet having a first outer circumferential surface polarity, a first inductor pole, and a second radially magnetized magnet having the first outer circumferential surface polarity, and a second cylindrical section, axially spaced from the first cylindrical section along the rotational axis, the second cylindrical section rotatably supported by the shaft, the second cylindrical section including a second circumferential segment, the second circumferential segment including a third radially magnetized magnet having the first outer circumferential surface polarity. The first and second circumferential segments are axially aligned.

DESCRIPTION OF EMBODIMENTS OF THE INVENTION

The invention can be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations can be included in the machine. While this description is primarily directed toward an electric machine providing power generation (i.e. "generator"), it is also applicable to an electric machine providing a driving force and/or an electric machine providing both a driving force and power generation. Further, the invention is applicable in any environment using an electric machine.

While "a set of" various elements will be described, it will be understood that "a set" can include any number of the respective elements, including only one element. Also as used herein, the terms "axial" or "axially" refer to a dimension along a longitudinal axis of an axis of rotation, and the terms "radial" or "radially" refer to a dimension extending between a center longitudinal axis, an outer generator circumference, or a circular or annular component disposed within the generator. The term "circumferentially" refers to a dimension extending along the circumference of the respective surface. Additionally, distinct components, elements, or the like are described herein as substantially identical or substantially similar, which can include non-limiting examples of substantial equivalence in size, shape, contour, volume, mass, or outer surface area of a respective outer surfaces.

The aspects of the rotor assembly of the disclosure include a set of radially magnetized magnetic materials, such as magnets. As used herein, "radially magnetized" is used to describe that a portion of the magnetic material closest to the radial center of the rotor assembly has a first pole or first polarity (e.g. magnetic north), and a portion of the magnetic material farthest from the radial center at the exteriorly circumferential surface of the rotor assembly 14 has a second opposing pole or second opposing polarity (e.g. magnetic south). As used throughout the disclosure, the "polarity", the "pole", the "polarity state", of the inductor poles or the magnetic materials, refers to the outer circumferential surface polarity of the respective rotor assembly element.

Figure 1:
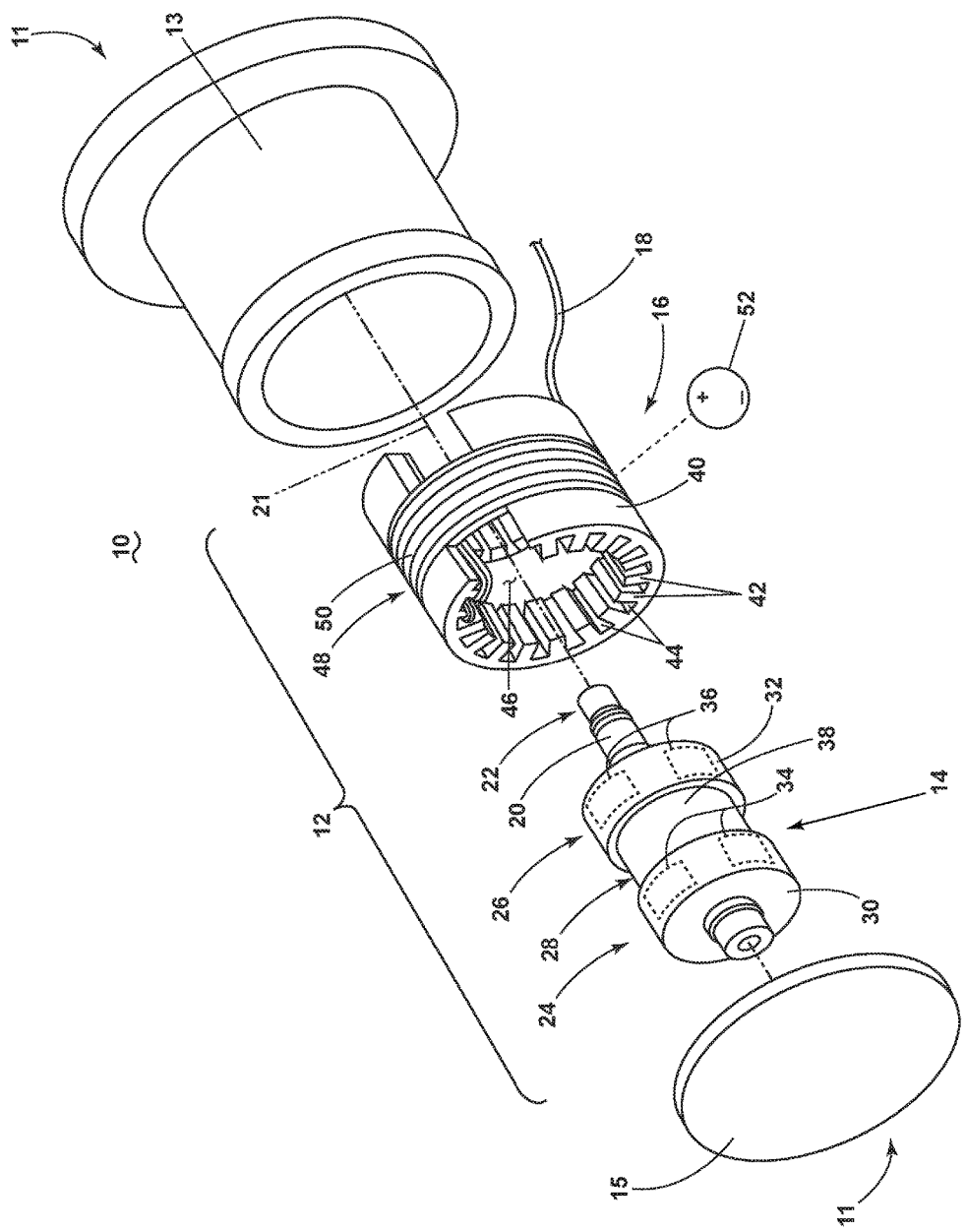
FIG. 1 illustrates an exploded perspective view of a generator assembly in accordance with various aspects described herein.

FIG. 1 illustrates an electric machine assembly, such as a generator assembly 10. In one non-limiting aspect, the generator assembly 10 can include a permanent magnet machine or generator. In another non-limiting aspect, the generator assembly 10 can include a consequent-pole permanent magnet machine or generator. The generator assembly 10 can include a housing 11, illustrated as a frame 13 and a lid 15, and a first machine 12 having a rotor assembly 14 and a stator assembly 16. At least one power connection, shown as an electrical power cable 18, can be provided on the exterior of the generator assembly 10 to provide for the transfer of electrical power to or from the generator assembly 10. Power can be transmitted by the electrical power cable 18, directly or indirectly, to an electrical load. In one non-limiting example aspect, the electrical power cable 18 can provide for a three-phase with a ground reference output from the generator assembly 10.

The rotor assembly 14 can include a rotatable shaft 20 configured to rotate about a common rotational axis 21 and having a first end 22 configured to mechanically couple or mount with a source of rotation (not shown). Spaced from the first end 22, the rotor assembly 14 can include a first substantially cylindrical section 24 and a second substantially cylindrical section 26. As used herein, the term "cylindrical" denotes that the respective sections 24, 26 have a cross-sectional circular area, shape, contour, or the like, and extends along an axial length of the rotor assembly 14. The cylindrical sections 24, 26 can also include an outer surface at a substantially common radial length from the rotatable shaft 20. The first cylindrical section 24 can be spaced from the second cylindrical section 26 by a third substantially cylindrical section 28. The third cylindrical section 28 can have a different cross-sectional area or a smaller radial length away from the rotatable shaft 20 than the first and second cylindrical sections 24, 26. Non-limited aspects of the disclosure can be included wherein the first and second cylindrical sections 24, 26 are contoured, manufactured, designed, or the like to be substantially identical in size and shape.

The first cylindrical section 24 can include a first rotor core 30 and a set of magnetic materials, such as a first set of permanent magnets 34 (schematically shown in dotted outline) supported by the first rotor core 30. Likewise, the second cylindrical section 26 can include a second rotor core 32 and a set of magnetic materials, such as a second set of permanent magnets 36 (schematically shown in dotted outline) supported by the second rotor core 32. Non-limiting examples of the rotor cores 30, 32 can include an iron core or a laminated iron pole. In one non-limiting example, the third cylindrical section 28 can include a solid iron yoke or third core 38, connecting the first rotor core 30 with the second rotor core 32. One non-limiting example of sets of permanent magnets 34, 36 can include rare earth permanent magnets. In another non-limiting example, the sets of permanent magnets 34, 36 can be radially magnetized, that is, wherein the portion of the permanent magnet 34, 36 closest to the radial center of the rotor assembly 14 has a first polarity, and the portion of the permanent magnet 34, 36 farthest from the radial center of the rotor assembly 14 has an opposing polarity directed parallel to the radius.

The first, second, and third cylindrical sections 24, 26, 28 are rotatably fixed or mounted with the rotatable shaft 20 such that the sections 24, 26, 28 operably co-rotate with the rotatable shaft 20 about the rotational axis 21. In one non-limiting example configuration, the rotatable shaft 20 can be configured such that mechanical force from a running turbine engine, directly or indirectly, such as by way of a gearbox, provides rotation to the shaft 20.

The stator assembly 16 can include a generally cylindrical core 40, a circumferentially spaced set of posts 42, and a set of winding slots 44 defined between two respectively spaced posts 42. In one non-limiting aspect, the core 40 can be formed from a set of laminations, but alternate forming or machining of materials, including ferromagnetic materials, can also be included. Collectively, the set of teeth or posts 42 and set of winding slots 44 are radially arranged at a predetermined spacing in the circumferential direction of the stator core 40 or stator assembly 16. The set of winding slots 44 are configured with an open top facing the circumferential center point of the stator assembly 16 and can terminate in opposing open ends spaced axially along the stator core 40 or stator assembly 16. In one non-limiting example configuration, the ends of the set of winding slots 44 can axially terminate at the same length as the core 40. An inner cavity 46 defined by the stator assembly 16, the set of posts 42, the stator core 40, or a combination thereof, is sized, shaped, contoured, or the like, to receive the rotatable rotor assembly 14.

The stator assembly 16 can further include a center section 48 spaced from the axial ends of the stator core 40 and defining a radial section for receiving a field coil 50. The field coil 50 can include an electrically conductive material or metal and encompassed by a non-conductive layer or coating to prevent conductive contact between segments of the field coil 50. The field coil 50 can be radially or annularly wound about the circumference of the center section 48, and can be selectively connected with a power source 52 (illustrated schematically) configured to operably energize the field coil 50 with a direct current (DC) voltage. The power source 52 can be further configured to supply the DC voltage at varying levels (e.g. variable excitation).

When assembled, the rotor assembly 14 is received within the cavity 46 of the stator assembly 16, and the stator assembly 16 is received within the housing 11. The housing lid 15 can be mounted or fixed relative to the housing frame 13 to environmentally protect or seal the generator assembly 10 from elements external to the housing 11. In one non-limiting aspect of the disclosure, the housing 11 can include a magnetically permeable material configured or arranged to provide a path for flux flow generated by the field coil 50. Aspects of the housing 11 are not germane to the disclosure.

Figure 2:
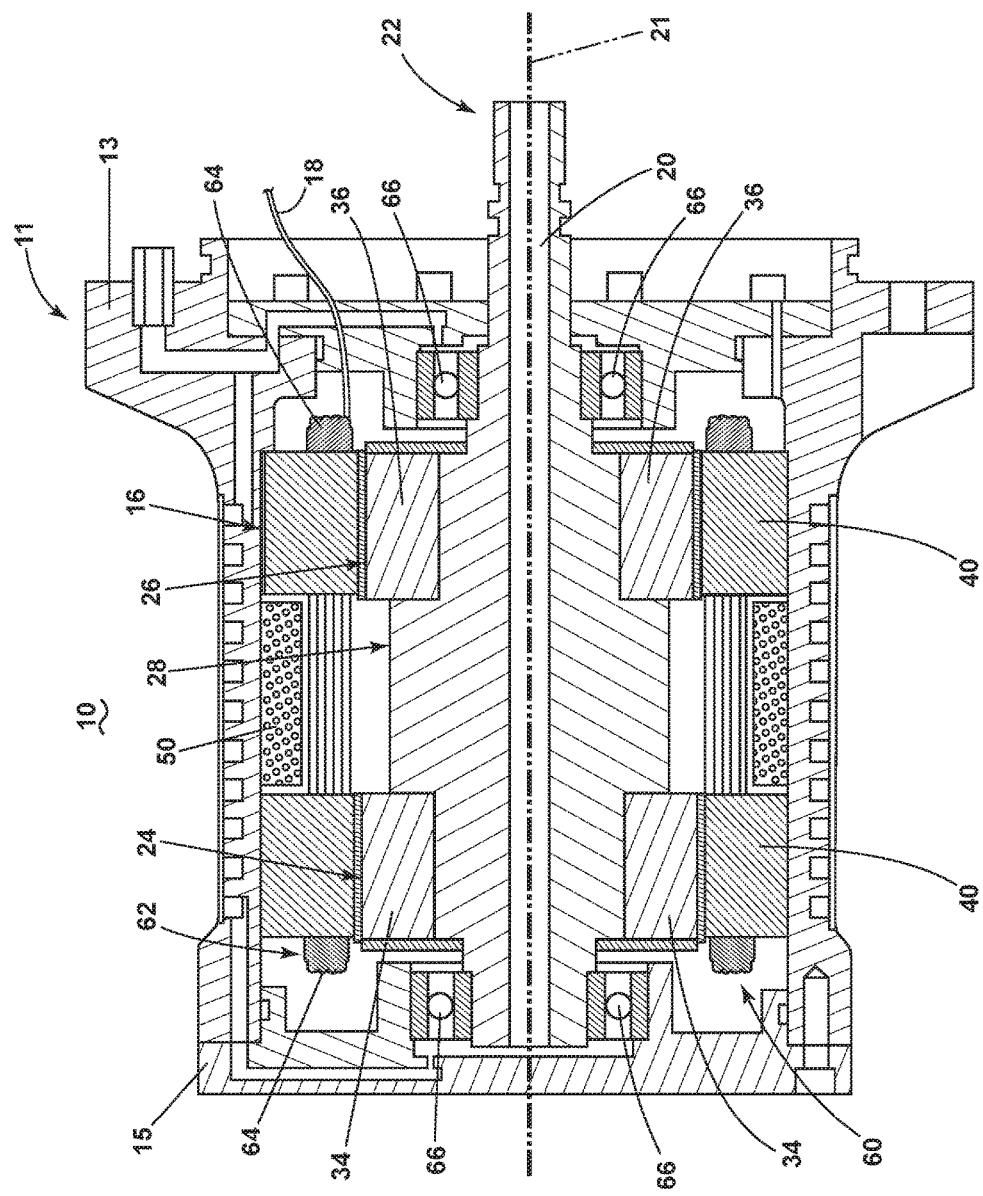
FIG. 2 illustrates a cross section of the generator assembly of FIG. 1, in accordance with various aspects described herein.

FIG. 2 illustrates a cross section of the generator assembly 10. As shown, the aspects of the disclosure can be included wherein the rotor assembly 14 includes a set of the surface-mounted permanent magnets 34, 36 at the outer surface of the respective first and second cylindrical sections 24, 26. In one non-limiting aspect of the disclosure, the permanent magnets 34, 36 can be adhered to the respective cylindrical sections 24, 26 for example, by epoxy. In another non-limiting aspect of the disclosure, the permanent magnets 34, 36 can be retained or restrained against the respective cylindrical sections 24, 26 by a sleeve.

The stator assembly is also illustrated including a set of stator windings 60 including a set of conductive wires that are wound about the stator core 40 within the set of winding slots 44. While only one set of stator windings 60 are shown, aspects of the disclosure can be included wherein at least one set of windings 60 is wound around the axial ends of at least one post 42 (henceforth, "end turns" 64) and through at least two adjacent winding slots 44 such that the energization of the stator windings 60 form a magnetic pole at the intervening post 42.

The set of stator windings 60 or the set of winding slots 44 can further include a non-conductive layer 62 for electrically isolating a winding 60 from another winding 60, or a winding slot 44 from another winding slot 44, respectively. In this sense, a set of stator windings 60 wound in a first winding slot 44 can be electrically isolated from a set of stator windings 60 wound in a second winding slot 44, as well as being isolated from the stator core 40. In such a configuration, the set of stator windings 60 can define a three-phase set of windings to generate three-phase power for the generator assembly 10 output or electrical power cable 18.

In one non-limiting example configuration, the rotatable shaft 20 can be supported by spaced bearings 66 such that the rotor assembly 14, including the first cylindrical section 24, the second cylindrical section 26, and the first and second sets of magnets 34, 36 can rotate relative to the stationary stator assembly 16, which is rotationally fixed within the generator assembly 10. For example, in one non-limiting example, the stator assembly 16 can be mounted to any suitable part of a housing 11.

During generator assembly 10 operation, a source of rotation drivably rotates the rotor assembly 14 relative to the stator assembly 16. The rotation of the magnetic field of set of magnets 34, 36 of the rotor assembly 14 relative to the stator assembly 16 and stator windings 60 induces an electrical current in the set of stator windings 60. The electrical current generated in the set of stator windings 60 can be operably provided to the electrical power cable, and further to an electrical load.

Figure 3:
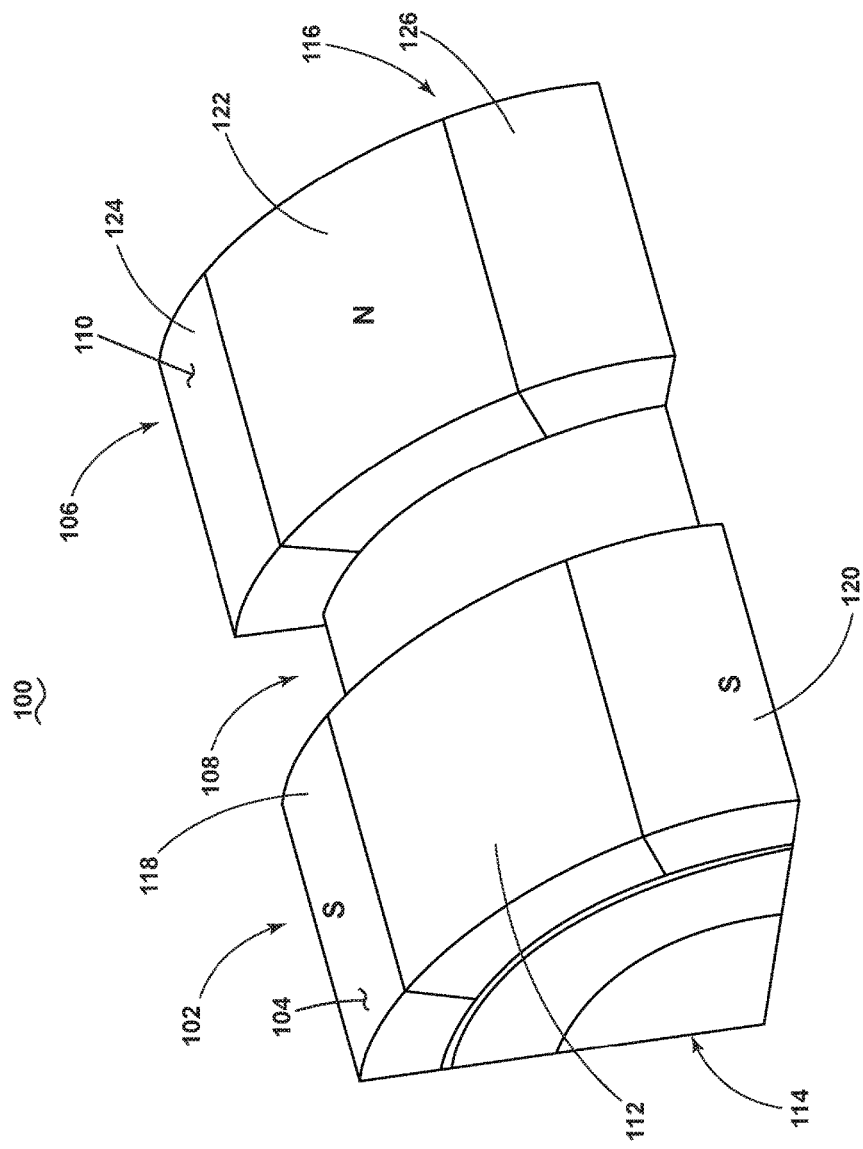
FIG. 3 is a perspective view of a portion of a prior art rotor assembly for a generator assembly.

FIG. 3 illustrates a partial perspective view of a typical rotor assembly 100 for a generator assembly of the prior art. As shown, the rotor assembly 100 can include a first cylindrical section 102 having a first rotor core 114, a second cylindrical section 106 having a second rotor core 116, and a third cylindrical section 108 joining the spaced first and second cylindrical sections 102, 106. The first and second cylindrical sections 102, 106 can define respective outer surfaces 104, 110.

In the illustrated example configuration, at least a portion of the outer surface 104 of the first cylindrical section 102 can include a first inductor pole 112 including material of the first rotor core 114, and flanked by adjacent first and second magnets 118, 120 (magnets 118, 120 labeled having a magnetic "South" poles). At least a portion of the outer surface 110 of the second cylindrical section 106 can also include a third magnet 122 (labeled having a magnetic "North" pole) flanked by adjacent second and third inductor poles 124, 126, the poles 124, 126 including material of the second rotor core 116. In the illustrated configuration, the first inductor pole 112 is axially spaced from the third magnet 122 and radially aligned with the third magnet 122. Additionally, the first inductor pole 112 and third magnet 122 are substantially similar in size and outer surface area (i.e. circumferential surface) of the respective outer surfaces 104, 110. Likewise, the first magnet 118 is axially spaced from and circumferentially aligned with the second inductor pole 124, and the second magnet 120 is axially spaced from and radially aligned with the third inductor pole 126. Also similar, the first magnet 118 and second inductor pole 124 are axially spaced from and circumferentially aligned with each other, and the second magnet 120 and the third inductor pole are axially spaced from and circumferentially aligned with each other.

While the perspective view of FIG. 3 illustrates approximately only twenty-five percent of the typical rotor assembly 100, the rotor assembly 100 is typically configured wherein the first magnet 118 and the second magnet 120 are substantially sized and contoured to be equal with the first inductor pole 112. Similarly, the second and third inductor poles 124, 126 are substantially sized and contoured to be equal with the third magnet 122. Thus, the illustrated configuration provides a prior art rotor assembly 100 wherein the circumference of the first cylindrical section 102 and the circumference of the second cylindrical section 106 are aligned and arranged in axially-spaced inductor and magnetic material pairs, wherein the pairs are circumferentially offset from one another by, in one non-limiting example, 45 degrees.

The perspective view shown is generally repeated about the total circumference of the rotor assembly 100 having a first cylindrical section 102 with circumferentially adjacent and alternating magnetic material 118, 120 and inductor poles 112. Likewise, the rotor assembly 100 has a second cylindrical section 106 that is generally repeated about the total circumference with circumferentially adjacent and alternating magnet material 122 and inductor poles 124, 126, wherein the magnetic material 122 of the second cylindrical section 106 is magnetically opposite of the magnetic material 118, 120 of the first cylindrical section. In this sense, the outer surfaces 104, 110 of the respective first cylindrical section 102 and second cylindrical section 106 include fifty percent magnetic material and fifty percent inductor poles. The inductor and magnetic material pairs do not overlap between circumferentially adjacent pairs.

Figure 4:
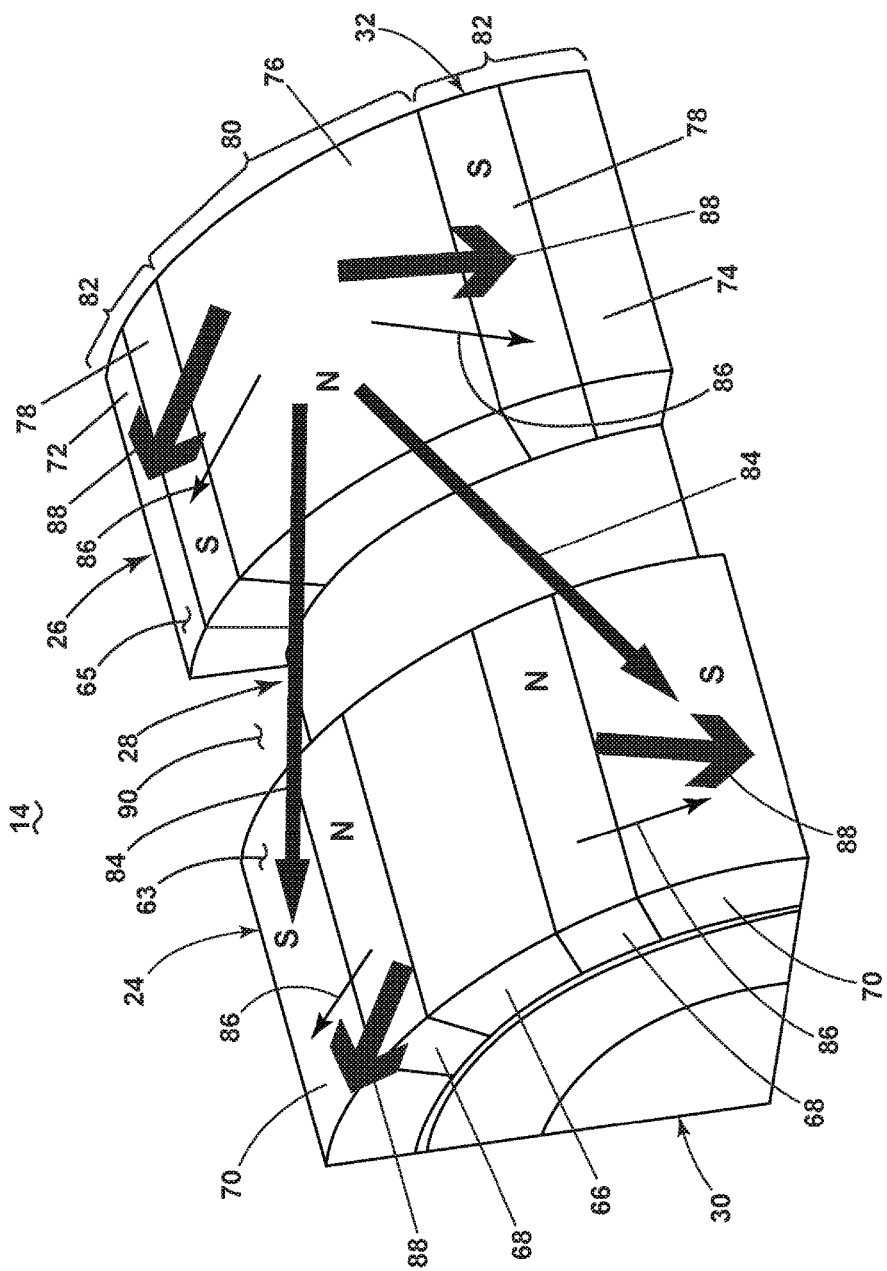
FIG. 4 is a perspective view of a portion of a rotor assembly including a set of flux paths for the generator assembly of FIG. 1, in accordance with various aspects described herein.

FIG. 4 illustrates a partial perspective view of the rotor assembly 14 in accordance with various aspects of the disclosure described herein. As shown, the first cylindrical section 24 can define a first outer surface 63 and include a first inductor pole 66, a first magnetic material 68 (illustrated as magnetic north), and a second magnetic material 70 magnetically opposed to the first magnetic material 68 (the second magnetic material illustrated as magnetic south). Also as shown, the second cylindrical section 26 can define a second outer surface 65 and include a second inductor pole 72, a third inductor pole 74, a third magnet material 76 (illustrated as magnetic north), and a fourth magnetic material 78 magnetically opposed to the third magnetic material 76 (the fourth magnetic material illustrated as magnetic south). The second magnetic material 70 and fourth magnetic material 78 are magnetically equivalent (e.g. magnetically south), and the first magnetic material 68 and the third magnetic material 76 are magnetically equivalent (e.g. magnetically north).

The first cylindrical section 24 is circumferentially arranged in the following, repeating, first serial pattern: an inductor pole 66, a first magnetic material 68, a second magnetic material 70, a first magnetic material 68, and an inductor pole 66. It is noted that the first serial pattern above is described commencing with an inductor pole 66, and commencing another repeated first pattern and the second-described inductor pole 66. Stated another way, the first serial pattern described above does not include adjacent and repeating inductor poles 66, and the second-described inductor pole 66 of the first pattern describes the repeated commencing of the first pattern.

The second cylindrical section 26 is circumferentially arranged in the following, repeating, second serial pattern: an inductor pole 72, 74, a fourth magnetic material 78, a third magnetic material 76, a fourth magnetic material 78, and an inductor pole 72, 74. As with the first serial pattern, it is noted that the second serial pattern above is described commencing with an inductor pole 72, 74, and commencing another repeated second pattern and the second-described inductor pole 72, 74. Stated another way, the second serial pattern described above does not include adjacent and repeating inductor poles 72, 74, and the second-described inductor pole 74 of the second pattern describes the repeated commencing of the second pattern.

While the perspective view of FIG. 4 illustrates approximately only twenty-five percent of the rotor assembly 14, aspects of the rotor assembly 14 can include a non-limiting configuration wherein the second magnetic material 70 and the third magnetic material 76 are substantially sized and contoured to be equal, but radially offset from one another by approximate 45 degrees. Similarly, aspects of the rotor assembly 14 can include a non-limiting configuration wherein the first inductor pole 66, the second inductor pole 72, and the third inductor pole 74 are substantially sized and contoured to be equal, but radially offset from one another by approximately 45 degrees. In the non-limited illustrated example of FIG. 4, for instance, the second inductor pole 72 is radially offset from the first inductor pole 66 in a counterclockwise direction by 45 degrees, while the third inductor pole 74 is radially offset from the first inductor pole 66 in a clockwise direction by 45 degrees.

As described above, the second magnetic material 70 and the third magnetic material 76 are substantially similarly sized, for example, with regards to the respective outer surface 63, 65 areas. The size, or outer surface area of other elements arranged about the first and second cylindrical sections 24, 26 can be further described with reference to the size or surface area of the second or third magnetic materials 70, 76. For example, in one non-limiting aspect of the disclosure, the inductor poles 66, 72, 74 can be substantially sized to be half of the size or surface area (i.e. circumferential surface area) of the second or third magnetic materials 70, 76. Likewise, the first magnetic material 68 and the fourth magnetic material 78 segments can be substantially sized to be a quarter of the size or surface area of the second or third magnetic materials 70, 76. In another non-limiting aspect of the disclosure, less than half of the total outer surface area of at least one of the first or second circumferential outer surfaces 63, 65 can be occupied by the respective set of inductor poles 66 or 72, 74.

The rotor assembly 14 illustrated further demonstrates a set of axially-spaced and circumferentially-aligned segments. For example, one non-limiting aspect of the disclosure can include a first axially-spaced and circumferentially-aligned segment 80 including a subset of the first serial pattern of the first cylindrical section 24 including the first inductor pole 66 adjacently flanked on circumferentially opposing sides by the first magnetic material 68, and the axially-spaced third magnetic material 76 of the second cylindrical section 26. It is noted the set of magnetic materials 68, 76 included in the first segment 80 include a similar magnetic configuration (e.g. magnetic north).

The first segment 80 is further demonstrates a non-limiting example set of second axially-spaced and circumferentially-aligned segments 82, adjacently flanking the first segment 80 on circumferentially opposing sides. Due to the partial perspective view of FIG. 4, only a partial view of the second segments 82 is viewable. In one non-limiting aspect of the disclosure, the second segment 82 can include the second magnetic material 70 of the first cylindrical section 24 and a subset of the second serial pattern of the second cylindrical section 26 including the respective second or third inductor pole 72, 74 adjacently flanked on circumferentially opposing sides by the fourth magnetic material 78.

It is noted the set of magnetic materials 70, 78 included in the second segment 82 include a similar magnetic configuration (e.g. magnetic south).

Thus, aspects of the disclosure describe a rotor assembly 14 and generator assembly 10 wherein the inductor poles are not equal size to axially-opposed and circumferentially aligned magnetic materials on the respective first and second cylindrical sections. Compared with the typical rotor assembly 100 in the prior art, the inductor poles 66, 72, 74 of the current disclosure are smaller or reduced in size, shape, or outer surface area than the inductor poles 112, 124, 126 of the prior art. Also as described, at least a portion of the reduction in size of the inductor poles 66, 72, 74 in the current disclosure can be replaced by, or can make space for including additional magnetic materials 68, 78 adjacent to and flanking the inductor poles 66, 72, 74.

FIG. 4 also illustrates the magnetic flux of the rotor assembly 14, in the form of a set of magnetic flux arrows. While an arrow is illustrated to represent magnetic flux, it is commonly understood that a magnetic flux includes a magnetic flux path. Thus, the set of magnetic flux arrows can be used to represent a portion of the magnetic flux path, with a return magnetic flux path included in the respective rotor core 30, 32, or by way of air gaps including, but not limited to an air gap 90 between the first and second cylindrical sections 24, 26. A first magnetic flux arrow 84 illustrates a magnetic flux between the third magnetic material 76 and the second magnetic material 70. This first magnetic flux arrow 84 illustrates a portion of the magnetic flux that is determined mainly by the geometry or relation of the magnetic materials 70, 76 and the reluctance of its path. A set of second magnetic flux arrows 86 illustrate a magnetic flux between adjacent magnetic materials on the respective first and second cylindrical sections 24, 26. As shown, the second magnetic flux arrows 86 can show respective magnetic fluxes between the first magnetic material 68 and the second magnetic material 70 of the first cylindrical section 24, and between the third magnetic material 76 and the fourth magnetic material 78 of the second cylindrical sections 26. A set of third magnetic flux arrows 88 illustrates a "net effect" flux for the illustrated rotor assembly 14 configuration.

The reduction or replacement of the inductor poles and the replacement or inclusion of additional magnetic materials operably results in a greater net effect flux for the current disclosure, compared with the net effect flux of the prior art rotor assembly 100.

Figure 5:
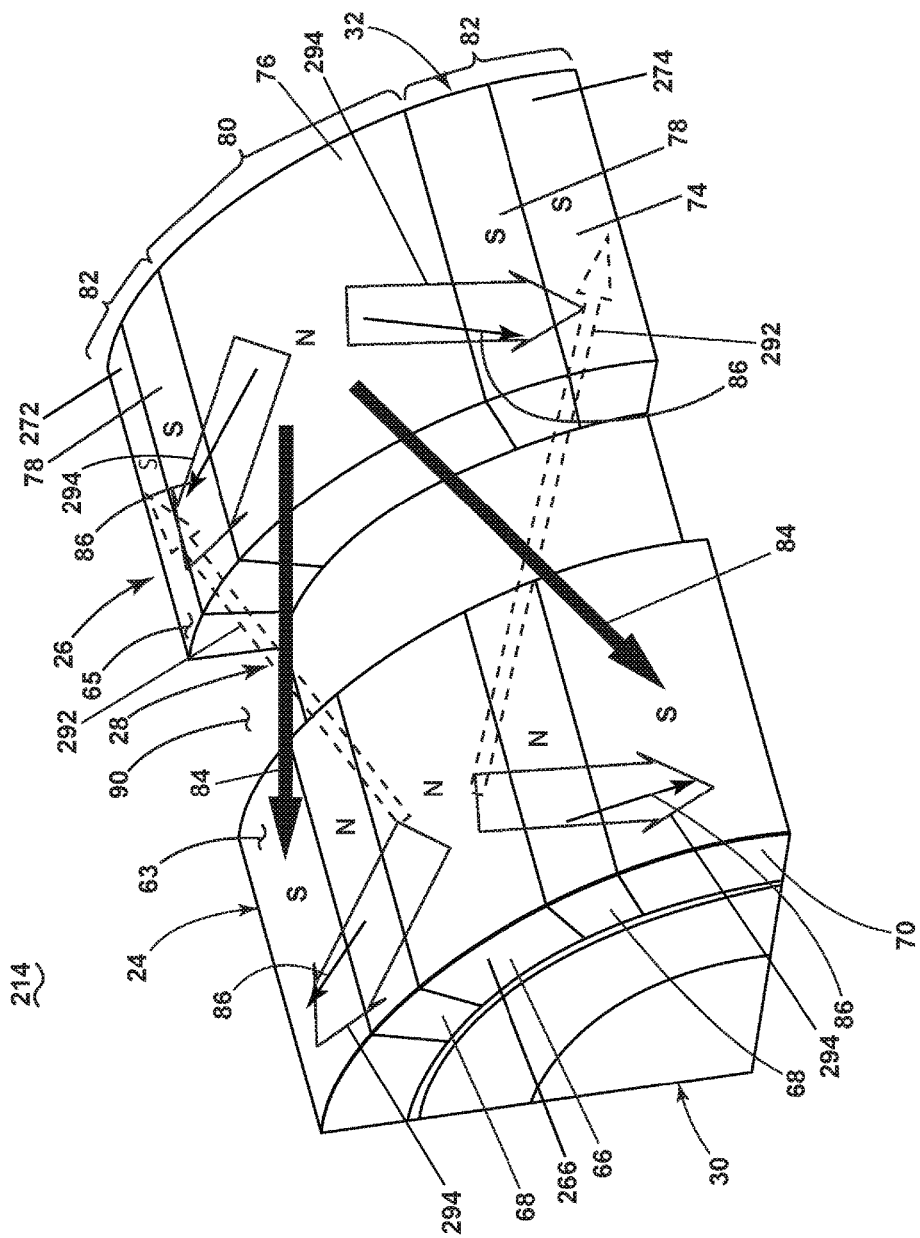
FIG. 5 is a perspective view of a portion of a rotor assembly including a set of flux paths for the generator assembly in boost mode, in accordance with various aspects described herein.

In another aspect of the disclosure, the generator assembly 10 can be operated in "boost mode." During boost mode, the generator assembly 10 operates to controllably apply a DC voltage from the power source 52 to the field coil 50 of the stator assembly 16. The energized field coil 50, in turn, generates a magnetic flux that flows from inductor pole to another inductor pole. FIG. 5 illustrates a non-limiting example configuration of a rotor assembly 214 of a generator assembly 10 operating in boost mode. The rotor assembly 214 is similar to the rotor assembly 14; therefore, like parts will be identified with like numerals increased by 200, with it being understood that the description of the like parts of the rotor assembly applies to the rotor assembly 214, unless otherwise noted.

A difference between the rotor assembly 14 and the rotor assembly 214 is that the inductor poles 266, 272, 274 are induced into a polarity state by the energization of the field coil 50. As shown, the first inductor pole 266 has been induced into the same polarity state as the adjacent first magnetic materials 68. In the non-limiting example illustrated, the first inductor pole 266 and the adjacent magnetic materials 68 have a magnetic polarity of north. Also shown, the second and third inductor poles 272, 274 of the rotor assembly 214 have likewise been induced into the same polarity state as the adjacent fourth magnetic materials 78. In the non-limiting example illustrated, the second and third inductor poles 272, 274 and the adjacent fourth magnetic materials 78 have a magnetic polarity of south.

FIG. 5 also illustrates the magnetic flux of the rotor assembly 214, in the form of a set of magnetic flux arrows. In addition to the first and second sets of magnetic flux arrows 84, 86 previously described, the polarized inductor poles 266, 272, 274 generate a magnetic flux between the opposing polarized poles. As shown, a fourth set of magnetic flux arrows 292 illustrates a magnetic flux between the polarized first inductor pole 266 and the polarized second inductor pole 272, and the polarized first inductor pole 266 and the polarized third inductor pole 272. A set of fifth magnetic flux arrows 294 illustrates a "net effect" flux for the illustrated rotor assembly 214 configuration.

The reduction or replacement of the inductor poles and the replacement or inclusion of additional magnetic materials operably results in a greater net effect flux for the current disclosure while the rotor assembly operates in boost mode, compared with the net effect flux of the prior art rotor assembly 100 operating in a comparable boost mode (e.g. with the same D.C. voltage or "boost current" applied by a DC power source).

In the normal operation of the generator assembly 10 (i.e. non-boost mode), as well as in boost mode, by reducing the inductor pole size, the flux density in the air gap 90 remains the same. Additionally, the reduced airgap area between the inductor pole and the stator assembly further reduces the flux leakage. Furthermore, by replacing at least a portion of the inductor pole volume with magnetic material, the net flux in the air gap 90 increases. Increasing the net flux in the air gap 90 allows the generator assembly 10 to operate at a certain power level in boost mode while requiring less field coil 50 current, compared with the prior art rotor assembly 100. Requiring less field coil 50 current while achieving a certain power level in boost mode increases the field coil 50 efficiency and reduces field coil 50 heating.

Many other possible aspects and configurations in addition to that shown in the above figures are contemplated by the present disclosure. For example, the exact dimensions of the generator assembly, the rotor assembly, the stator assembly, the set of inductor poles, or the sets of magnetic materials is highly application specific. Aspects of the disclosure can be included wherein the axial length of the generator assembly or the subcomponents can be elongated or shorted, based on an expected or designed operating volume or operational envelope of the power generation requirements. Additionally, the illustrated examples provide one non-limiting example of the disclosure. Aspects of the disclosure can be included having alternative numbers, configurations, placements, and the like, of the magnets or inductor poles, so long as the magnets or inductor poles conform to the descriptions herein.

The aspects disclosed herein provide a rotor assembly and generator assembly configured to generate a higher power output under normal generator operation and boost mode operation, when compared with a typical generator assembly. One advantage that can be realized in the above disclosure is that the above-described generator can achieve higher power levels, higher power output, and a higher power density in the same spatial envelope compared with a typical generator. The above-described generator can likewise achieve higher power levels, higher power output, and a higher power density while operating in boost mode, compared with a typical generator.

Another advantage that can be realized in the above disclosure is that the above-described generator can achieve a comparable power output level, or achieve a similar desired flux density of generator operation at a lower D.C. voltage or lower current applying boost mode. Achieving a similar or higher power density, power output, and the like at a lower D.C. voltage or lower current during boost mode in turn reduces or eliminates the heat dissipating aspects of the generator or field coil. Yet another advantage of the above-described disclosure is that the above-described generator can operate with a higher dynamic range of power outputs while operating under boost mode.

To the extent not already described, the different features and structures of the various aspects can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly for an electric machine comprising:
   a shaft having a rotational axis;
   a first cylindrical section rotatably supported by the shaft and having a first rotor core and a first set of radially magnetized magnets including a first subset of magnets having a first outer circumferential surface polarity, and a second subset of magnets having a second outer circumferential surface polarity; and
   a second cylindrical section, axially spaced from the first cylindrical section along the rotational axis, the second cylindrical section rotatably supported by the shaft and having a second rotor core and a second set of radially magnetized magnets.

2. The rotor assembly of claim 1 wherein the second set of radially magnetized magnets includes a third subset of magnets having the first outer circumferential surface polarity and a fourth subset of magnets having the second outer circumferential surface polarity.

3. The rotor assembly of claim 1 wherein the first cylindrical section further includes a set of inductor poles circumferentially spaced about the rotational axis between at least two adjacent magnets.

4. The rotor assembly of claim 3 wherein the first cylindrical section defines an outer surface having a circumferentially repeating serial pattern of an inductor pole, a first magnet having the first outer circumferential surface polarity, a second magnet having the second outer circumferential surface polarity, and a third magnet having the first outer circumferential surface polarity.

5. The rotor assembly of claim 4 wherein the inductor pole has half of the outer surface area of the second magnet and wherein the first magnet has a quarter of the outer surface area of the second magnet.

6. The rotor assembly of claim 4 wherein the second cylindrical section further includes a set of inductor poles circumferentially spaced about the rotational axis between at least two adjacent magnets, and wherein the second cylindrical section defines an outer surface having a circumferentially repeating serial pattern of an inductor pole, a fourth magnet having the second outer circumferential surface polarity, a fifth magnet having the first outer circumferential surface polarity, and a sixth magnet having the second outer circumferential surface polarity.

7. The rotor assembly of claim 6 wherein the inductor pole of the second cylindrical section has half of the outer surface area of the fifth magnet and wherein the fourth magnet has a quarter of the outer surface area of the fifth magnet.

8. The rotor assembly of claim 7 wherein at least one of the first or second sets of inductor poles is configured to be operably induced to include an inductor outer circumferential surface polarity of the same polarity of the immediately circumferentially adjacent outer circumferential surface polarities.

9. The rotor assembly of claim 7 wherein the second magnet and the fifth magnet are circumferentially offset by 45 degrees.

10. The rotor assembly of claim 6 wherein the first magnet, the third magnet, and the fifth magnet have the same outer circumferential surface polarity, and wherein the second magnet, the fourth magnet, and the sixth magnet have the same outer circumferential surface polarity.

11. The rotor assembly of claim 1, further including a first circumferential segment including a portion of the first cylindrical section having, sequentially, a first magnet having the first outer circumferential surface polarity, a first inductor pole, and a second magnet having the first outer circumferential surface polarity, and including a portion of the second cylindrical section having a third magnet having the first outer circumferential surface polarity.

12. The rotor assembly of claim 1 wherein at least one of the first or second sets of magnets are surface-mounted to the respective first or second rotor core.

13. A power generation system includes:
an electric machine comprising:
  a stator core; and
  a rotor configured to rotate relative to the stator core about a rotational axis, the rotor comprising:
    a first cylindrical section having a first circumferential outer surface including an alternating first set of radially magnetized magnets and a first set of inductor poles; and
    a second cylindrical section, axially spaced from the first cylindrical section along the rotational axis, the second cylindrical section having a second circumferential outer surface including an alternating second set of radially magnetized magnets and a second set of inductor poles;
  wherein less than half of the surface area of the first circumferential outer surface is occupied by the first set of inductor poles.

14. The power generation system of claim 13 wherein the stator core further includes a field coil.

15. The power generation system of claim 14 wherein the field coil is circumferentially wrapped about a portion of the stator core such that the field coil is axially located between the first cylindrical section and the second cylindrical section.

16. The power generation system of claim 14 wherein the field coil is selectively energizable.

17. The power generation system of claim 16 wherein at least one of the first set of inductor poles or the second set of inductor poles is polarized in response to the selective energization of the field coil.

18. A rotor assembly for an electric machine comprising:
a shaft having a rotational axis;
a first cylindrical section rotatably supported by the shaft including a first circumferential segment including, sequentially, a first radially magnetized magnet having a first outer circumferential surface polarity, a first inductor pole, and a second radially magnetized magnet having the first outer circumferential surface polarity; and
a second cylindrical section, axially spaced from the first cylindrical section along the rotational axis, the second cylindrical section rotatably supported by the shaft, the second cylindrical section including a second circumferential segment, the second circumferential segment including a third radially magnetized magnet having the first outer circumferential surface polarity;
wherein the first and second circumferential segments are axially aligned.

19. The rotor assembly of claim 18 wherein the first cylindrical section further includes a third circumferential segment including a third radially magnetized magnet having a second outer circumferential surface polarity, and wherein the second cylindrical section further includes a fourth circumferential segment including, sequentially, a fifth radially magnetized magnet having the second outer circumferential surface polarity, a first inductor pole, and a sixth radially magnetized magnet having the second outer circumferential surface polarity.

20. The rotor assembly of claim 19 wherein the third and fourth circumferential segments are axially aligned.

* * * * *